US008635457B2

(12) United States Patent
Tuliani et al.

(10) Patent No.: US 8,635,457 B2
(45) Date of Patent: Jan. 21, 2014

(54) DATA CERTIFICATION METHODS AND APPARATUS

(75) Inventors: Jonathan Roshan Tuliani, Cambridge (GB); Michael Bursell, Halstead (GB)

(73) Assignee: Cryptomathic Ltd., Cambridge, Cambridgeshire (GB)

( * ) Notice: Subject to any disclaimer, the term of this patent is extended or adjusted under 35 U.S.C. 154(b) by 1091 days.

(21) Appl. No.: 11/661,784

(22) PCT Filed: Aug. 16, 2005

(86) PCT No.: PCT/GB2005/003199
§ 371 (c)(1),
(2), (4) Date: Dec. 7, 2007

(87) PCT Pub. No.: WO2006/024816
PCT Pub. Date: Mar. 9, 2006

(65) Prior Publication Data
US 2008/0163337 A1    Jul. 3, 2008

(30) Foreign Application Priority Data
Sep. 2, 2004  (GB) .................................. 0419479.1

(51) Int. Cl.
*G06F 21/00*    (2013.01)

(52) U.S. Cl.
USPC ............. 713/176; 380/28; 380/270; 380/277; 726/3; 726/4; 726/5; 726/10; 709/219; 709/225; 709/229

(58) Field of Classification Search
USPC .......................................................... 713/176
See application file for complete search history.

(56) References Cited

U.S. PATENT DOCUMENTS

| 6,363,479 | B1 | 3/2002 | Godfrey et al. | |
| 6,725,376 | B1 * | 4/2004 | Sasmazel et al. | 726/10 |
| 6,959,336 | B2 * | 10/2005 | Moreh et al. | 709/229 |
| 6,961,849 | B1 * | 11/2005 | Davis et al. | 713/167 |
| 6,978,367 | B1 * | 12/2005 | Hind et al. | 713/167 |
| 7,506,368 | B1 * | 3/2009 | Kersey et al. | 726/12 |
| 7,557,941 | B2 * | 7/2009 | Walmsley | 358/1.14 |

(Continued)

OTHER PUBLICATIONS

Optimistic fair exchange of digital signatures|http://citeseerx.ist.psu.edu/viewdoc/download?doi=10.1.1.20.1276&rep=rep1&type=pdf|Asokan et al.|Nov. 17, 1997|pp. 1-24.*

(Continued)

*Primary Examiner* — Mahfuzur Rahman
(74) *Attorney, Agent, or Firm* — Knobbe, Martens, Olson & Bear, LLP

(57) ABSTRACT

This invention generally relates methods, computer program code, data processing apparatus, and signals for certifying data, in particular by means of an electronic signature. Embodiments of the invention can be implemented on a user terminal without the need for dedicated hardware or software and may be termed "zero-footprint" data certification methods. A method of providing an electronic signature to-a-server; the method including receiving data for said server at a proxy system for said server; reading said received data to identify a signature request; obtaining a signature for a portion of said received data associated with said request responsive to said request, and providing said signature from said proxy system to said server. The use of a signature-enabled reverse proxy enables the use of a zero footprint user terminal, that is without the need to add additional functionality to the terminal for the purposes of signature creation in the context of a distributed application architecture.

11 Claims, 4 Drawing Sheets

(56) References Cited

U.S. PATENT DOCUMENTS

| | | | |
|---|---|---|---|
| 7,793,342 B1* | 9/2010 | Ebrahimi et al. | 726/8 |
| 8,527,767 B2* | 9/2013 | Brown et al. | 713/170 |
| 2002/0078355 A1 | 6/2002 | Samar | |
| 2002/0116619 A1 | 8/2002 | Maruyama et al. | |
| 2002/0178381 A1 | 11/2002 | Lee et al. | |
| 2003/0018913 A1* | 1/2003 | Brezak et al. | 713/201 |
| 2004/0003238 A1* | 1/2004 | Mak et al. | 713/156 |
| 2004/0015725 A1* | 1/2004 | Boneh et al. | 713/201 |
| 2004/0030932 A1* | 2/2004 | Juels et al. | 713/202 |
| 2004/0078422 A1 | 4/2004 | Toomey | |
| 2005/0091484 A1* | 4/2005 | Thornton et al. | 713/156 |
| 2005/0257045 A1* | 11/2005 | Bushman et al. | 713/156 |
| 2005/0278534 A1* | 12/2005 | Nadalin et al. | 713/175 |
| 2006/0264202 A1* | 11/2006 | Hagmeier et al. | 455/411 |
| 2008/0022383 A1* | 1/2008 | Bobde et al. | 726/10 |
| 2008/0104390 A1* | 5/2008 | VanHeyningen et al. | 713/151 |
| 2009/0013399 A1* | 1/2009 | Cottrell et al. | 726/12 |
| 2009/0204545 A1* | 8/2009 | Barsukov | 705/75 |

OTHER PUBLICATIONS

Edwards, Richard: "Security Technology Audit Cryptomathic Cryptomatchi Signer 2.2" Butler Group Subscription Services, [Online] Dec. 2003, retrieved from http://www.cryptomatic.com/pdf/Cryptomathic%20Signer%20-%20Butler%20Group%20Technology%20Audit.pdf retrieved on Nov. 9, 2005.

Melzer, Ingo and Jeckle, Mario: "A Signing Proxy for Web Services Security," Berliner XML Tage 2003, [Online] Oct. 13, 2003, pp. 292-304, Berlin, Germany retrieved from http://www.ingo-melzer.de/papers/bxml03.pdf on Nov. 11, 2005.

International Search Report dated Jun. 25, 2009. Appl. No. 05 775 723.9-2413, pp. 1-2.

International Search Report dated Apr. 1, 2008. International Appl. No. PCT/GB2005/003199, pp. 1-7.

International Search Report dated Jan. 19, 2011 Appl. No. EP 10 18 5585, pp. 1-7.

Edwards, Richard: "Security Technology Audit Cryptomathic Cryptomathic Signer 2.2" Butler Group Subscription Services, [Online] Dec. 2003, retrieved from http://www.cryptomatic.com/pdf/Cryptomathic%20Signer%20-%20Butler%20Group%20Technology%20Audit.pdf retrieved on Nov. 9, 2005.

Felten E W et al.: "Web Spoofing: An Internet Con Game," Software World, A.P. Publications, London, GB, No. 540-96, Mar. 1, 1997, pp. 1-9, ISSN: 0038-0652.

Fritsch, Lothar: "A Secure, Economic Infrastructure for Signing of Web Based Documents and Financial Affairs," CBL—Journal Cyberbanking and Law, [Online] Jan. 2002, retrieved from http://www.wiiw.de/publikationen/Asecureeconomicinfrastructure477.pdf on Nov. 10, 2005.

Johnson B C: "How Web Spoofing Works," Internet Citation, Aug. 1998, retrieved from http://www.systemexperts.com/tutors.webspoof.pdf retrieved on Aug. 22, 2005.

Melzer, Ingo and Jeckle, Mario: "A Signing Proxy for Web Services Security," Berliner XML Tage 2003, [Online] Oct. 13, 2003, pp. 292-304, Berlin, Germay retrieved from http://www.ingo-melzer.de/papers/bxml03.pdf on Nov. 11, 2005.

Network Box Security Response: "Network Box Anti-Spam System," Internet Citation Aug. 2004, retrieved from http://www.network-box.com/fileadmin/download __resources/public/Technology_Documentation/v1__Anti-Spam__White_Paper.pdf on Aug. 8, 2005.

Communication pursuant to Article 94(3) EPC, issued on Aug. 3, 2012 in connection with corresponding European Application No. EP 05 775 723.

Communication pursuant to Article 94(3) EPC, issued on Sep. 12, 2012 in connection with corresponding European Application No. EP 10 185 585.

* cited by examiner

DATA CERTIFICATION METHODS AND APPARATUS

CROSS-REFERENCE TO RELATED APPLICATIONS

This application is the U.S. National Phase under 35 U.S.C. §371 of International Application No. PCT/GB2005/003199, filed Aug. 16, 2005, designating the United States and published in English on Mar. 9, 2006, as WO 2006/024816, which claims priority to United Kingdom Application No. 0419479.1, filed Sep. 2, 2004.

FIELD OF THE INVENTION

This invention generally relates methods, computer program code, data processing apparatus, and signals for certifying data, in particular by means of an electronic signature. Embodiments of the invention can be implemented on a user terminal without the need for dedicated hardware or software and may be termed "zero-footprint" data certification methods.

DESCRIPTION OF RELATED ART

With the increasing use of computer networks such as the Internet for business and other transactions there is a growing need for improved techniques for digitally signing data.

One commonly used technique for generating digital signatures employs asymmetric or public key cryptography which uses a pair of keys, one private and one public (although in practice distribution of the public key is also often restricted). A message encrypted with the public key can only be decrypted with the private key, and vice-versa. An individual can thus encrypt data using the private key for decryption by any one with the corresponding public key and, similarly, anyone with the public key can securely send data to the individual by encrypting it with the public key safe in the knowledge that only the private key can be used to decrypt the data.

Asymmetric cryptography was first publicly disclosed by Diffie and Hellman in 1976 (W. Diffie and D. E. Hellman, "New directions in cryptography", IEEE Transactions on Information Theory, 22 (1976), 644-654) and a number of asymmetric cryptographic techniques are now in the public domain of which the best known is the RSA (Rivest, Shamir and Adleman) algorithm (R. L. Rivest, A. Shamir and L. M. Adleman, "A method for obtaining digital signatures and public-key cryptosystems", Communications of the ACM, 21 (1978), 120-126). Other more recent algorithms including elliptic curve crypto systems (see, for example, X9.63, "Public key cryptography for the financial services industry: Key agreement and key transport using elliptic curve cryptography", Draft ANSI X9F1, October (1999)).

An infrastructure known as PKI (Public Key Infrastructure) is often used to provide key management functions. A Public Key Infrastructure normally includes provision for digital identity Certificates. To prevent an individual posing as somebody else an individual may prove his identity to a certification authority which then issues a certificate signed using the authority's private key and including the name and public key of the individual. The Certification Authority's (CA's) public key is widely known and therefore trusted and since the certificate could only have been encrypted using the authority's private key, the public key of the individual is verified by the certificate. Further details of PKI can be found in the X.509 specifications (PKIX) which can be found at www.ietf.org, all hereby incorporated by reference.

Electronic signatures, or MAC (message authentication code) values may also be generated using symmetric cryptography, for example computed using a shared secret key. A well known example of symmetric cryptography is the US Data Encryption Standard (DES) algorithm and its variant triple DES (in which two or three keys are used in succession for additional security); other examples include RC4 and the International Data Encryption Algorithm (IDEA). An example MAC is provided in IS08731-1, "Banking-proved Algorithms for Message Authentication-Part I; DEA"; another example is described in "Computer Data Authentication", National Bureau of Standards, FIPS113, 1985.

A digital signature may be generated by encrypting either the message or a digest or hash of the message. Providing the recipient has the original message they can compute the same digest or hash and thus authenticate the signature. Examples of one-way collision-resistant (hard to guess) hash functions are given in Rivest, "The MD4 message-digest algorithm," Internet Request for Comments 1320, April 1992, and R. Rivest, "The MD5 message-digest algorithm," Internet Request for Comments 1321, April 1992.

The signatures described in this document may be generated using either symmetric or asymmetric cryptography.

Both the symmetric and asymmetric digital signatures described above have disadvantages, in particular requiring the storage of a secret or private key at a user terminal, which may compromise security and create a significant management overhead. For a period a popular alternative was to store the secret key on a chip or smart card but a lack of standardization and high deployment costs have hampered the progress of this approach. The applicant's have previously described, in WO 03/015370, the use of separate signature and authentication servers to provide one solution to this problem. However an architecture which did not require any additional specialised functionality at a user terminal for the purposes of signature creation would be a benefit.

At this point it is useful to review a typical distributed application architecture such as a web application architecture.

Referring to FIG. 1, this shows a commonly used distributed application architecture in which a user of a terminal or client computer system 10 communicates with an application server 20 via a proxy server 30. Typically communication with the proxy server 30 is over the internet and application server 20 comprises a web server. In practice there may be multiple users and multiple applications. There may be a firewall (not shown) between the proxy server and application server, or between the user and the proxy server.

In the systems to be described below the proxy server 30 is a reverse proxy, that is it represents the content of application server 20 to outside clients, typically providing increased security by preventing direct, unmonitored access to the application server. To the user or client terminal 10 the reverse proxy appears to be the real content server.

In FIG. 1 the user has a connection to the proxy, and the proxy a connection to the application. Information is passed between the user and the application via the proxy. Often, the connection from user to proxy or proxy to application is secured (encrypted and/or authenticated). Authentication may take place in both directions on each connection, i.e. from proxy to user workstation and user workstation to proxy.

The proxy may have one or more of a number of functions, for example:

1. Protecting the application from attackers.
2. Providing authentication to the user on behalf of the application.
3. Managing authentication of users on behalf of the application.

A typical example is a web application. Here, the user has a web browser which connects over the internet to the reverse proxy and the application server is a web server, which sits 'behind' the reverse proxy. (There may in addition be other application and database layers behind the web server, but they are not relevant to this discussion). In this case the reverse proxy typically authenticates to the user by means of a cryptographic key pair and a corresponding X.509 certificate, and the user may authenticate himself to the reverse proxy by a variety of means, such as a username and password, token-generated one-time-password or some other token. The SSL (secure sockets layer) protocol may be used for one or more secure connections to the proxy server 30.

It would be of benefit to be able to provide a signing capability for a user in the distributed application architecture of FIG. 1 without the need for the user to locally store a secret key and moreover without the need for any dedicated software running on the user's terminal, be it pre-installed or downloaded as an applet or similar.

SUMMARY OF THE INVENTION

According to a first aspect of the present invention there is therefore provided a method of providing an electronic signature to a server, the method comprising: receiving data for said server at a proxy system for said server; reading said received data to identity a signature request; obtaining a signature for a portion of data associated with said request responsive to said request, and providing said signature from said proxy system to said server.

The proxy system may obtain the signature either by itself signing the data associated with the request (or a hash or digest thereof) or by sending the data to be signed (or a hash or digest thereof) to a signature server. Likewise the sender (who may be the originator) of the received data may be authenticated by the proxy system, for example by requesting identification data and associated password, or by a separate authentication server, on request from the proxy system.

The data to be signed may originate from a user of the server, for example the user filing in a form for signature, or the data for signature may be provided by the server or proxy system. For example, the data to be signed may comprise a license agreement or a set of terms and conditions which are provided to the user; in this case it will be appreciated that there is no need for this data to be sent back to the proxy since the proxy system can keep a record of the data sent to the user for signature. Similarly the data to be signed may comprise an amalgamation of data communicated in a plurality of batches. For example, data for a large number of transactions may be provided by, say, the server to the user, possibly over a period of time, and at some later stage the user may be presented with a summary for signature.

Generally there will be a plurality of users/originators, in which case the proxy system may receive or obtains identification of a user or user group and obtains a corresponding signature.

The signature may employ symmetric or asymmetric cryptography (or both). Generally the signature and the data which has been signed are both provided to the server (although a signature allowing message recovery may be used) but in some cases the signature may be additionally or alternatively provided to a second server such as an audit system. There may be a plurality of servers associated with the proxy system, in which case the signature (and associated signed data) is provided to the particular application server being proxied to the user requesting the signature.

It is envisaged that in embodiments of the system the proxy server and one or more associated application servers will be managed by a single entity. Thus preferably the method includes authenticating the proxy system to the originator of the data to be signed, that is to the user terminal or client, the reverse proxy then becoming a trusted entity.

Optionally following receipt of a request for a signature the data to be signed may be returned to user for confirmation of the signing; this may be included as part of the originator authentication procedure.

The signature request may comprise a signature request tag (which may be an address of a signature server) which is attached to a request for data to be signed sent from the (application) server via the proxy server to the client so that this tag requesting signature is automatically returned to the proxy end in association with the data to be signed provided by the user in response to the request.

In a related method the invention provides a method of providing an electronic signature to a server, the method comprising: receiving data to be signed from said server at a proxy system; sending said data to be signed from said proxy system to a user; receiving a signature request for said data to be signed at said proxy system; obtaining a signature for said data to be signed responsive to said signature request, and providing said signature from said proxy system to said server.

Thus the invention also provides a data carrier carrying a computer network signal, the signal comprising a signature request tag in association with data for signature. The signature request tag may comprise a flag or, for example, a URL or other address of a system for providing a signature. For example, on a form such as an HTML form an action such as a "submit" button may have associated with it an address of a signature server which is part of or associated with the proxy system. In another example the tag may comprise data which is "hidden" that is not displayed to the user but which is nonetheless returned with data captured from the user, for example a hidden field in an HTML form called signature and having a null value. In this case the proxy system may provide a value for the signature (optionally as described below in conjunction with a signature server) prior to forwarding the signature (generally with the signed data) to the server. In a related aspect the invention provides a data carrier carrying a computer network signal, the signal comprising a signature request tag in association with an identifier for data to be signed where, for example, the actual data to be signed has previously been provided (see, for example, the illustration given above of signing a license agreement).

In a further related aspect the invention provides a method of supplying electronic data to a remote device for signing, the method comprising: receiving data at a user terminal from a first remote device, said received data incorporating a request for user input data and signature request data; inputting user data in accordance with said request, and outputting to a second remote device data incorporating said user input data and said signature request data.

In a further related aspect the invention also provides a method of authenticating electronic data supplied by a user of a source device to a remote device, the method comprising: receiving input data including data for authentication from the source device; identifying authentication request information in the input data; obtaining authentication data for said data for authentication responsive to said identifying, and outputting the authentication data for said remote device; wherein the authentication data authenticates that the supplier of the data is the user.

The invention further provides apparatus to implement the above described methods.

Thus in another aspect the invention provides a data processing apparatus for processing electronic data supplied by a user of a source device to be signed, the apparatus comprising; a communication interface for inputting and outputting data; a data memory operable to store data to be processed; an instruction memory storing processor implementable instructions; and a processor coupled to said data memory and to said instruction memory and operable to read and process the stored data in accordance with the instructions in the instruction memory; and wherein the instructions stored in the instruction memory comprise instructions for controlling the processor to: receive input data including data for authentication from a source device; identifying authentication request information in the input data; obtain authentication data for said data for authentication; and output the authentication data for a recipient device; wherein the authentication data authenticates that the supplier of the data is the user.

The invention further provides a processing apparatus for processing electronic data to be signed, the apparatus comprising: a communication interface for inputting and outputting data; a data memory operable to store data to be processed; an instruction memory storing processor implementable instructions; and a processor operable to read and process the stored data in accordance with the instructions in the instruction memory; and wherein the instructions stored in the instruction memory comprise instructions for controlling the processor to: receive from a first remote device data incorporating a request for user input data and signature request data; input user data in accordance with said request; and output to a second remote device data incorporating said user input data and said signature request data.

The invention further provides a reverse proxy device, the device comprising means to authenticate an application to a user of a user terminal; means to obtain an authentication for said user of said user terminal; means to obtain a signature for user data; and means to receive from said terminal user data for signature and a signature request, and responsive to said signature request, to obtain a signature for said user data and forward said signature and said user data to said application.

The invention also provides a signal, the signal including data for submission to a computer program requiring signed data, characterised in that the signal further includes a request for the data to be signed.

It is also desirable to provide additional protection against some types of man-in-the-middle attacks, particularly those where an internal resource has been tampered with.

Thus, the invention further provides a method of protecting a link between a user terminal and an application server via a proxy system for said application server, the method comprising: receiving data from said application server at said proxy system; determining whether said received data includes data for establishing a connection between said user terminal and an address to which connection is forbidden; and forwarding said received data to said user terminal responsive to said determining.

Embodiments of this invention allow an internal proxy to check outgoing data, for example to check that all URIs (including URLs) are either on an approved list of machines, and/or an approved list of URIs/paths, and/or internal rather than external (to an organisation, user group or network). This facilitates ensuring that contents of forms previously served have not been tampered with.

The method may comprise inhibiting the forwarding of data from the application server to the user terminal if the data includes data for establishing a connection between the user terminal and a forbidden address. This might appear to the user for example as a connection timeout or a blank document. Alternatively the method may comprise modifying the data to remove data for establishing a connection between the user terminal and a forbidden address. In this example the user might still receive some data sent from the application server but some part of the data would be missing. This part of the data might comprise data normally visible to the user or data normally hidden from the user. Forbidden addresses might comprise any addresses connectable to the user terminal other than via the proxy system. Alternatively, the proxy system may comprise a list of permitted addresses, which are compared with the data sent from the application server. Any addresses found in the data, which are not on the list, would be deemed forbidden. In a further alternative example, the proxy system may comprise a list of forbidden addresses, which are compared with the data sent from the application server. Any addresses found in the data, which are on the list, would be deemed forbidden. In either list example, the list may comprise a list of one or more regular expressions, so that a plurality of addresses may be matched using each regular expression.

In one example the link between the user terminal and the application server via the proxy system comprises a packet data link. Packet data comprises packet header data and packet payload data. The data received from the application server at the proxy system comprises packet payload data. The proxy system determines whether the packet payload data includes data for establishing a connection between the user terminal and a forbidden address. Preferably the link between the user terminal and the proxy system is secure, for example using SSL.

Preferably the determining step comprises parsing the received data for a connection address. The received data may be in a variety of different formats, for example HTML, XML, WML, Adobe™ PDF or a word processor document format. Parsing may comprise parsing data normally visible to the user for a connection address or data normally hidden from the user such as control codes or mark-up tags.

Preferably the proxy system outputs audit data to an audit log if the received data includes data for establishing a connection between the user terminal and a forbidden address. Preferably the proxy system also outputs system management data to provide an alert if the received data includes data for establishing a connection between the user terminal and a forbidden address.

The invention further provides a data processing apparatus for protecting a link between a user terminal and an application server via a proxy system for said application server: receiving data from said application server at said proxy system; the apparatus comprising; a communication interface for inputting and outputting data; a data memory operable to store data to processed; an instruction memory storing processor implementable instructions; and a processor coupled to said data memory and to said instruction memory and operable to read and process the stored data in accordance with the instructions in the instruction memory; and wherein the instructions stored in the instruction memory comprise instructions for controlling the processor to; whether said received data includes data for establishing a connection between said user terminal and an address to which connection is forbidden; and said received data to said user terminal responsive to said determining.

In one example the data processing apparatus is configured to operate as a reverse proxy server. In addition to reverse proxy functions it provides a means for protecting the link between the user terminal and the application server.

The invention further provides computer program code, in particular on a carrier, to implement the above described methods. The carrier may comprise a data carrier such as a disk, CD-or-DVD ROM, programmed memory such as read-only memory (firmware), or an optical or electrical signal carrier. Code to implement embodiments of the invention may comprise code in a conventional programming language such as C, or lower level code such as assembly language code, or still lower level code such as microcode or code for setting up or controlling an ASIC or FPGA, or hardware description language code such as Verilog (trademark), VHDL (very high speed integrated hardware description language) or the like. The skilled person will appreciate such code (and/or data) may be distributed between a plurality of coupled components in communication with one another, for example on a network.

The above described feature and aspects of the invention may be combined in any permutation.

BRIEF DESCRIPTION OF THE DRAWINGS

These and other aspects of the invention will now be described, by way of example only with reference to the accompanying figures in which.

DETAILED DESCRIPTION OF PREFERRED EMBODIMENTS

Figure 1:
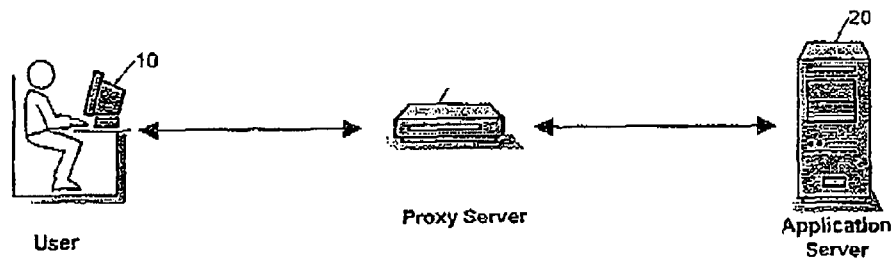
FIG. 1 shows a typical distributed application architecture.
Figure 2A:
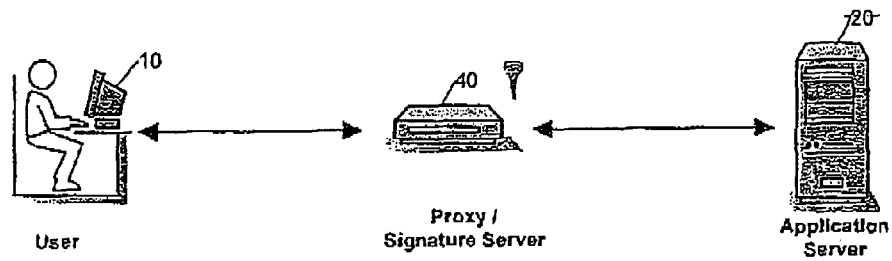
FIGS. 2a and 2b show, respectively, first and second distributed computer systems embodying aspects of the present invention.

Referring now to FIG. 2a, this shows how the architecture of FIG. 1 may be extended to support digital signatures. In FIG. 2a the functionality provided by proxy 40 has been extended to include the role of signature server. The proxy/signature server maintains ownership of the user's private key and uses it to append signatures to data sent from the user to the application, as required.

To indicate that the user wishes a piece of data to be signed, (s)he simply includes some form of 'sign-me' label on that data for this purpose. The proxy/signature server scans all data received from the user looking for such a label. If found, the proxy/signature server creates a signature on the data concerned and sends this together with the original data to the application server.

Before creating such a signature, it is important that the proxy/signature server authenticates the user, so that the correct private key can be used and to prevent use of the key by anyone else. This can be achieved, for example, by requiring that the connection from user to proxy is authenticated by the user; for this any conventional means may be employed.

The application server may have previously requested that the user provide a signed response, so that the user (or terminal) knows when to use the 'sign-me' label. This process may be "automated", with the user's terminal employing the 'sign-me' label on receipt of an instruction to do so from the application server without the need for user intervention.

A number of variations of this basic architecture are possible.

The proxy/signature server described has four main areas of functionality: Acting as a proxy between user and application server; authenticating the application to the user; authenticating the user's identity; and creating signatures on behalf of the user. Some of these functions may be achieved by the involvement of an additional dedicated server, and in particular the latter two of the four functions listed may be delegated to another server.

For delegated authentication the user's identity and/or authenticating data may be stored in an external system. The architecture described with reference to FIG. 2a may therefore be modified so that the task of identifying and authenticating the user is delegated to a separate identification and authorisation server.

The task of creating signatures on behalf of the user may also be delegated to an external signature(s) server, rather than having the signature server functionality incorporated directly in the proxy. In this case, the user's authenticated identity is passed to the signature server.

An electronic signature is typically computed based on a representative of the data being signed (a message hash or digest), rather that directly on the data itself. The computation of the message hash may be performed either by the proxy (in which case only the message hash need be passed to the signature server) or by the signature server (in which case the full data to be signed is passed to the signature server). Both the authentication and signature functions may be delegated, in which case they may be delegated either to two separate servers (one for each function) or to a single combined authentication and signature server.

In any of these cases, a trusted relationship between the proxy and the authorisation server and/or proxy and signature server is required. Mechanisms can be used to ensure the integrity and authenticity of data passed between servers, for example relying on physical security (the servers all being located within a single, secure building) and/or electronic security (secure, encrypted connections being established between the servers).

Figure 2B:
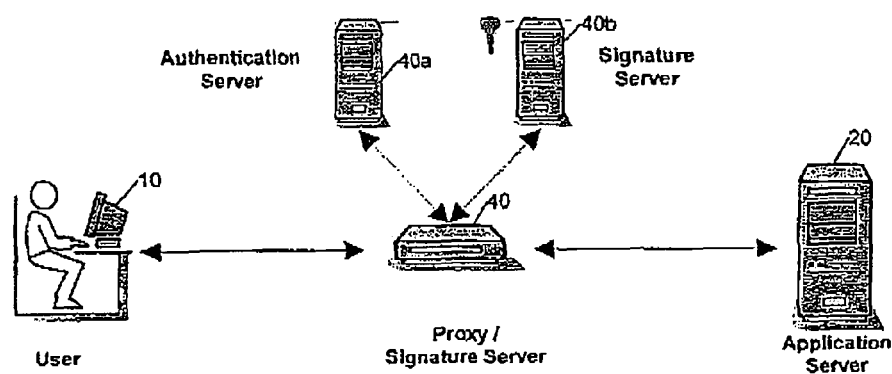

FIG. 2b illustrates an example architecture in which reverse proxy server 40 is coupled both to a user authentication server 40a and to a signature server 40b.

So far, we have considered the case in which the user is authenticated when the connection from user to proxy is first formed, but there are alternatives to this. For example the authentication may take place at any time between the initialisation of the connection between user and proxy/signature server and the receipt of the 'sign-me' label.

User authentication may also take place on receipt of the 'sign-me' label. In this case, the proxy/signatures server requests authentication from the user on receipt of the 'sign-me' label, and proceeds with the signature creation and forwards the signed data to the application server only once this authentication is complete. This form of authentication may be extended to include user confirmation of the data to be signed. On receipt of data accompanied by a 'sign-me' label, the proxy/signature server returns the data (or summary thereof) to the user, together with a request for authentication. The authentication provided by the user therefore acts as a confirmation that the data presented to the user is correct.

We have considered the case in which the proxy creates signatures on behalf of users, using a different private key for each user. It is also possible for the proxy to use a single key for all users or a group of users, and then to also include the user's identity in the data being signed. In this case the application validates the proxy/signature server's signature, rather than a signature specific to a particular user, which may be a simpler task since a public key specific to the user concerned is not required. The proxy/signature server is trusted to place the correct user's identity in the signed message, but this is no greater level of trust than that bestowed upon it in the previously described scenarios.

Embodiments of the invention described above provide a number of advantages. These include a "zero footprint"—that is the user's terminal is simply required to create a secure connection to the proxy and there is no need to add additional functionality to the terminal for the purposes of signature creation. Integration with the application server is simple—the server must simply put 'sign-me' request labels on data it wishes to be signed, and process the resulting signatures accordingly. Furthermore there is a separation of the signature functionality from the application: Security is achieved by means of administrative and procedural controls at the proxy (and associated authentication and signature servers, if used). Thus the application is restricted from subverting the signature process, particularly where user confirmation of the data to be signed is employed. The cost of employing such controls at the application can therefore be avoided.

Figure 3:
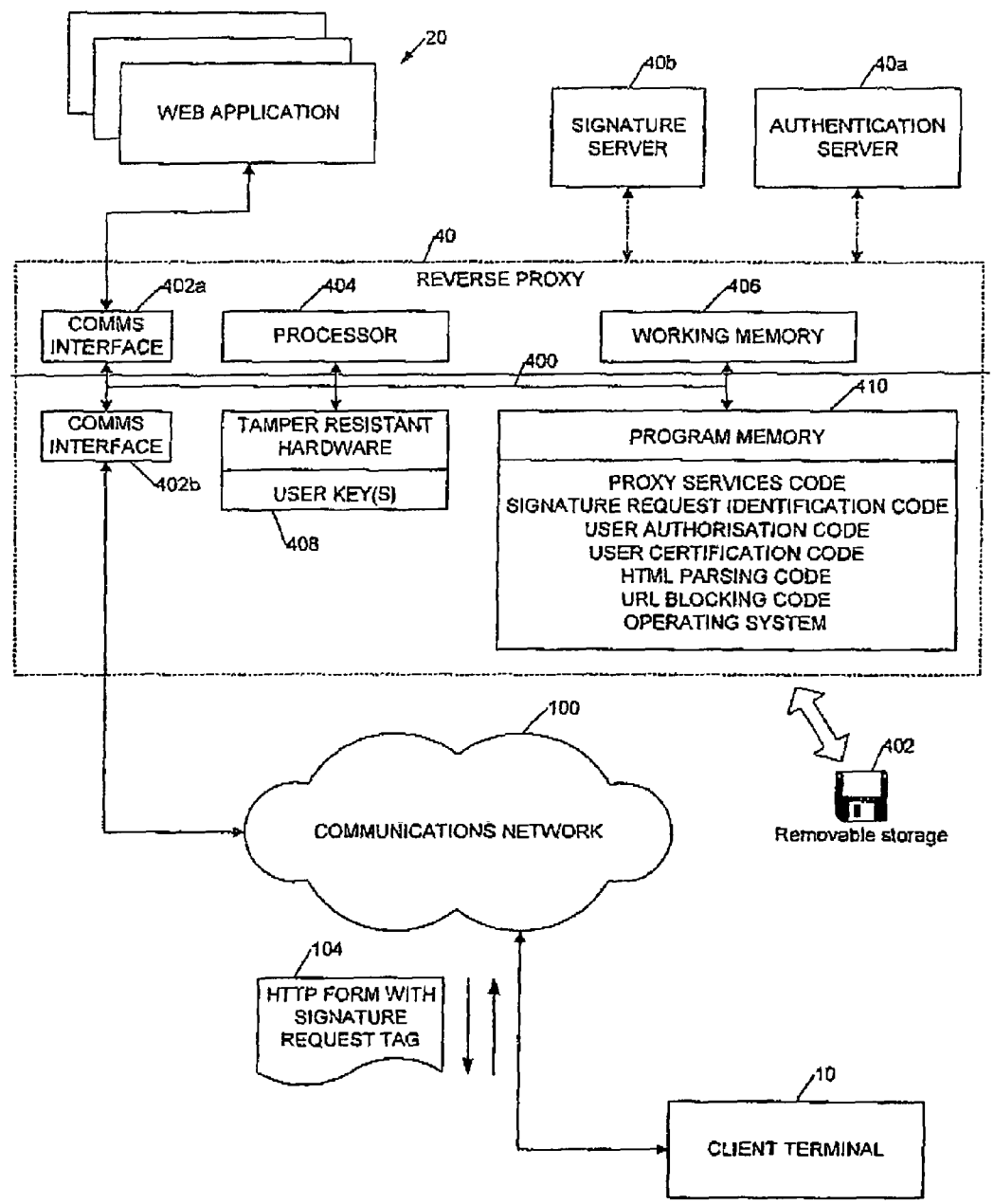
FIG. 3 shows a diagram of a computer system including a reverse proxy signature system according to an embodiment of an aspect of the present invention.

Referring now to FIG. 3, this shows a block diagram illustrating details of the systems of FIGS. 2a and 2b. In FIG. 3 user or client terminal 10 is coupled to the reverse proxy server 40 by means of a communications network 100 which may comprise any conventional wired and/or wireless communications network including, but not limited to, the Internet, a wide, local or personal area computer network, a mobile communications network such as a mobile phone network or any other type of network or combination of these.

The reverse proxy 40 comprises one or more communications interfaces 402a, b for interfacing with communications network 100 and one or more web applications 20 provided by one or more corresponding application servers. The communications interfaces are coupled to an internal bus 400 to which are also coupled a processor 404, working memory 406, tamper resistant hardware 408 storing one or more private user keys (optional where a separate signature server 40b is employed), and permanent program memory 410, the contents of which may be provided on a data carrier illustratively shown by disk 412. An example of suitable tamper resistant hardware is the IBM 4758 Hardware Security Module which provides tamper resistant storage and processing. Program memory 410, in embodiments, stores proxy services code, signature request identification code, user authorisation code (optional where a separate authentication server 40a is employed), user certification code (optional where a separate signature server is employed), and operating system code. Optionally program memory 410 may farther include HTML parsing and URL blocking code as described in more detail later. Processor 404 loads and implements this code to provide corresponding functions as described further below.

In embodiments a request for user data to be signed together with a request for a user signature, illustratively shown in FIG. 3 by HTTP form 104 which includes a signature request tag. This issued by a web application 20 and forwarded by reverse proxy 40 over communications network 100 to clients terminal 10 where the user fills in the form and sends data back over network 100 to reverse proxy 40 which recognises signature request tag and signs the user data accordingly before passing the signed data back to the issuing web application.

Figure 4:
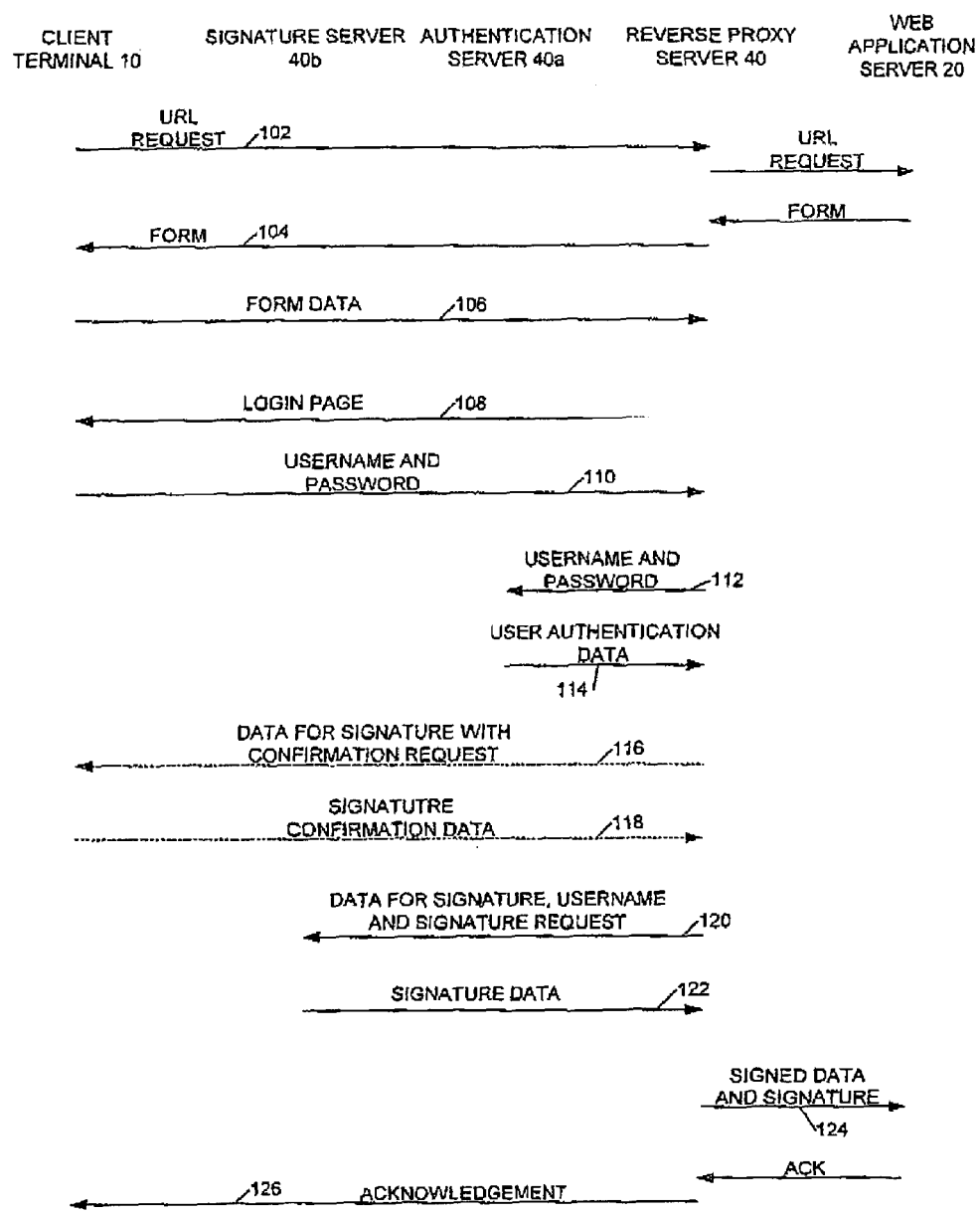
FIG. 4 shows signalling illustrating a procedure for implementing an embodiment of an aspect of the present invention.

Referring now to FIG. 4, this shows signals exchanged by the entities of FIG. 3 during this procedure. We assume, at the point at which FIG. 4 begins, that reverse proxy 40 has authenticated itself to a user of client terminal 10, for example by means of SSL. Thus in web-based system operating within a PKI infrastructure a web browser on client terminal 10 will normally store a root certificate from a certification authority such as Verisign™; such a facility is generally provided as standard even on hand-held mobile devices such as PDAs.

Referring now to FIG. 4, at step 102 user terminal 10 issues a URL (Uniform Resource Locator) request (input by a user) for a web application 20, which is forwarded by reverse proxy server 40 to the web application server. In response the web application server sends (in this example) an HTTP form including "a sign me" tag to reverse proxy 40 which in turn forwards the form 104 to terminal 10. Terminal 10 receives the form and displays corresponding content to the user requesting input of data including data to be signed. The user inputs this data and the form data is returned 106 to the reverse proxy server 40 together with the "sign me" tag. The reverse proxy server reads the received data, identifies the "sign me" tag and at this stage (in this example) identifies that the user is not authenticated. Proxy server therefore creates a login page which it sends 108 back to terminal 10 where the user inputs a user name and password which is returned 110 to the proxy server 40; alternatively login page may be provided by a separate server.

The proxy server 40 then checks the password by providing 112 the user name and password to authentication server 40a and receiving back 114 from the authentication server user authentication data; alternatively authentication may be performed by the signature server or the reverse proxy server itself. Then, optionally, the reverse proxy server sends 116 the data for signature back to the client terminal 10 together with a request for confirmation that this data is to be signed, receiving back 118 signature confirmation data. Where steps 116 and 118 are implemented obtaining a signature is conditional upon user confirmation. In variants of the procedure user confirmation may be requested at an earlier stage, for example before or at the same time as user authentication.

The reverse proxy server 40 then sends 120 the data to be signed (or a hash or digest of this data) to the signature server 40b together with the user name or other user identification (so that the signature server can select the signature to use), and if necessary together with a command requesting signature. The signature server 40b finds the data it receives from the reverse proxy server and returns 122 the signature. The signature is then forwarded at 124 by the reverse proxy server to the web application server together with the signed data; alternatively the signature and signed data may be send elsewhere, for example to an audit system. Finally the web applications server sends an acknowledgement signal 126 back to the client terminal 10 via the reverse proxy server 40.

We next describe another implementation of a (reverse) proxy for content and form protection. This may be used together with, or separately from, the above described systems.

Figure 5A:
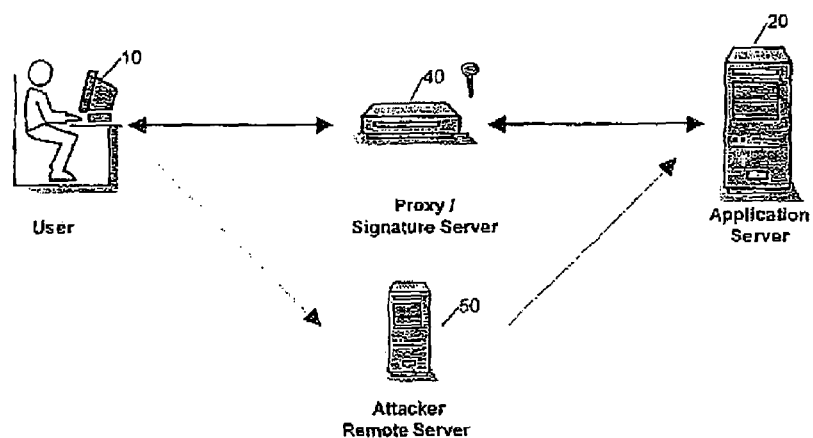
FIG. 5a shows a man-in-the-middle attack preventable by an aspect of the present invention and FIG. 5b shows signalling illustrating the man-in-the-middle attack.
Figure 5B:
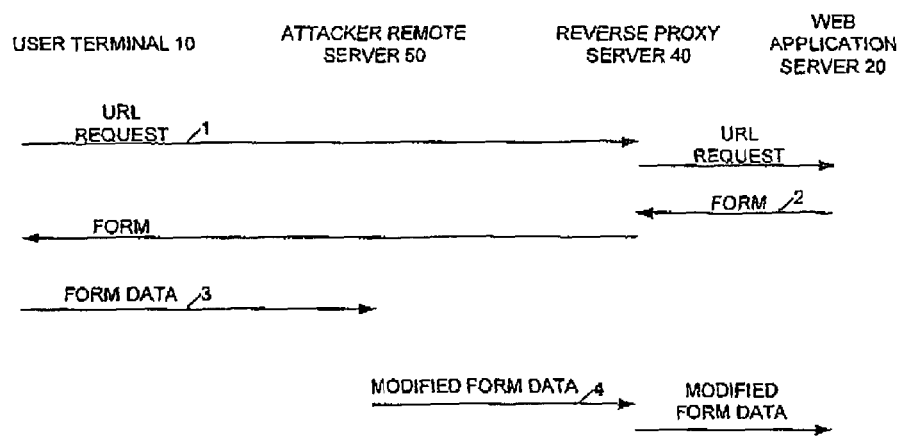

Thus optionally the proxy server 40 may also parse HTML data sent from the application server 20 to the user terminal 10 and block unauthorised URLs to prevent some types of man-in-the-middle attacks. FIG. 5a shows an example of a man-in-the-middle attack preventable by this method and FIG. 5b shows signalling used in the attack. The web application server 20 has been compromised in this example and has been configured to serve web page data incorporating the address of a remote server 50 used by the attacker to collect confidential information from users. The user terminal 10 issues 1 a URL request for a web application, which is forwarded by reverse proxy server 40 to the web application server. This might happen, for example, when the user requests a form. In response the web application server sends 2 an HTML form including a URL to divert the user to the attacker's remote server (using, for example, a URL of the cracker site as the "submit to" field, rather than the application server's own URL), as well as form fields for information such as credit card details, address, etc. The user fills in these details and clicks submit, thinking that (s)he is sending them to the application server. In fact they are sent 3 to the attacker's remote server, and the attacker may collect this information and/or change the values (for example to transfer money to a different account) before submitting it 4 to the application server via the reverse proxy server. It may be impossible for the reverse proxy server to determine that this has happened, since the attacker may spoof the address of the user terminal so that the data appears to have come from the user.

To prevent this kind of attack, the proxy server may incorporate HTML parsing code to parse each HTML document sent from the application server to the user terminal looking for URLs or IP addresses; optionally URL blocking code may also be included (see program memory 410 of FIG. 3). This stops the attack method at step 2, before the HTML form reaches the user terminal. The user requests a form from the web server. The web server sends the user the form via the proxy. The proxy checks the form for prohibited URLs and finds one in the "submit to" field. The proxy then logs that this has happened, for example, either by outputting to the standard message output or by writing to a separate audit log. Additionally it could send an alert, for example by generating an SNMP event, which would notify the system administrator that a prohibited URL had been detected. It might also send an error message to the user. An additional refinement would be for the (reverse) proxy, as well as or instead of checking URIs, to put a MAC or other hash of the form in as a hidden field. Other information might include the IP address to which the information is being sent. It can then look to see, when returned forms come back, whether any data has been changed, and whether the returning IP address is the same as that to which it was sent. In all cases, this puts security issues in one domain, and separates them from the application domain.

Any URLs the proxy finds are checked against a list stored on the proxy server, either to allow only URLs on the list or alternatively to prohibit any URLs on the list. If the proxy server finds a prohibited URL, it may either block the HTML document completely or remove the prohibited URL before sending the document on to the user terminal. Since there may be a plurality of application servers connected to the proxy server, it may be advantageous to allow URLs of other application servers connected to the proxy server. This may be achieved by a static list of permitted URLs as already described, or by incorporating part of the routing table for the proxy server in the list, which would have the advantage of being updated continuously by the proxy server's network software. Furthermore, in addition to text string URLs, regular expressions may be used. This allows the use of wildcards to describe a plurality of URLs or IP addresses using a single list entry, and can reduce the length of the list as well as speed up the URL checking process.

The parsing code need not be limited to HTML documents. Since the data sent from the application server to the user terminal may comprise other document formats such as XML, WML, Adobe™ PDF or a word processor document format such as Microsoft™ Word, each having URL-embedding capabilities, a plug-in architecture for different document formats may be utilised. The proxy server identifies the document format from the data received from the application server and runs the appropriate parser code to look for URL data. Furthermore, some document formats allow scripting languages to be embedded within a document, for example Javascript within HTML documents or macros within Word documents. These present an additional challenge as it may not be possible for the parser to determine the result of a script incorporated in a document. Such a script may, for example, generate a forbidden URL when run at the user terminal without incorporating the text of the URL in the document as received from the application server. In this case the parser may block all scripting language code, or permit only certain pre-determined scripting language code passages in the data received from the application server. This works in a similar way to parsing a list of permitted URLs; in addition care must be taken to ensure that it is not possible to generate a forbidden URL using only permitted scripting language code passages in the document.

No doubt many other effective alternatives will occur to the skilled person. It will be understood that the invention is limited to the described embodiments and encompasses modifications apparent to those skilled in the art lying within the spirit and scope of the claims amended hereto.

What is claimed is:

1. A method of providing an electronic signature to a server, the method comprising:
   receiving data from a user for said server at a proxy system for said server;
   reading said received data, at said proxy system, to identify a signature request from said user of said server;
   responsive to identifying said signature request, creating, using said proxy system, a signature on behalf of said user for a portion of data associated with said signature request;
   authenticating said user using said proxy system;
   providing said signature and said portion of data signed by said proxy system from said proxy system to said server, wherein creating and providing said signature are subject to said user being authenticated; and
   filtering data received from said server for providing to said user to control provisioning of data to said user for establishing connections other than via said proxy system.

2. A method as claimed in claim 1 wherein said portion of data for which said signature is obtained comprises a portion of said received data.

3. A method as claimed in claim 1 wherein said portion of data for which said signature is obtained comprises data received from said server at said proxy system and forwarded by said proxy system to said user.

4. A method as claimed in claim 1 wherein said receiving comprises receiving data from a plurality of different users; wherein said signature is common to a group of said users; and further comprising providing a user identifier to said server in association with a said common signature.

5. A method as claimed in claim 1 further comprising sending a confirmation request to said user, said confirmation request including said portion of received data to be signed, for confirmation of signing said portion of received data; and receiving confirmation data from said user; and wherein said signature creating is responsive to said confirmation data.

6. A method as claimed in claim 1 wherein said signature request comprises a signature request tag, the method further comprising:
   receiving said signature request tag from said server at said proxy system in association with a request for additional data;
   forwarding said signature request tag and said request for additional data to a remote system; and
   receiving data comprising said signature request tag and said additional data from said remote system at said proxy system, said portion of data for signature comprising a portion of said additional data.

7. A method as claimed in claim 1 further comprising authenticating said proxy system to a sender of said data portion.

8. A method as claimed in claim 1 wherein said providing of said signature to said server comprises providing said signature to a second server.

9. A method of providing an electronic signature to a server, the method comprising:
- receiving data to be signed from said server at a proxy system;
- sending said data to be signed from said proxy system to a user;
- receiving a signature request for said data to be signed at said proxy system;
- creating, using said proxy system, a signature on behalf of said user for said data to be signed responsive to said signature request having been confirmed by said user;
- authenticating said user using said proxy system;
- providing said signature and said data signed by said proxy system from said proxy system to said server, wherein creating and providing said signature are subject to said user having been authenticated; and
- filtering said data received from said server for providing to said user to control provisioning of data to said user for establishing connections other than via said proxy system.

10. Non-transitory storage medium comprising computer program code carrying computer program code to, when running, implement the method of claim 1.

11. A computer system including a proxy system comprising the non-transitory storage medium comprising computer program code of claim 10 and at least one said server, said proxy system and said at least one server being coupled by a secure link.

* * * * *